United States Patent
Laurichesse (10) Patent No.: US 10,732,295 B2
(45) Date of Patent: Aug. 4, 2020

(54) POSITIONING AND NAVIGATION RECEIVER WITH A CONFIDENCE INDEX

(71) Applicant: CENTRE NATIONAL D'ETUDES SPATIALES, Paris (FR)

(72) Inventor: Denis Laurichesse, Tournefeuille (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 611 days.

(21) Appl. No.: 15/326,096

(22) PCT Filed: Jul. 16, 2015

(86) PCT No.: PCT/EP2015/066299
§ 371 (c)(1),
(2) Date: Jan. 13, 2017

(87) PCT Pub. No.: WO2016/008991
PCT Pub. Date: Jan. 21, 2016

(65) Prior Publication Data
US 2017/0199281 A1    Jul. 13, 2017

(30) Foreign Application Priority Data
Jul. 17, 2014 (FR) .................................... 14 56862

(51) Int. Cl.
G01S 19/39 (2010.01)

(52) U.S. Cl.
CPC ................... G01S 19/396 (2019.08)

(58) Field of Classification Search
CPC .......... G01S 19/07; G01S 19/22; G01S 19/27; G01S 19/39; G01S 19/40
See application file for complete search history.

(56) References Cited

U.S. PATENT DOCUMENTS

| 5,373,298 A | 12/1994 | Karouby |
| 8,186,626 B1 * | 5/2012 | Liu .......................... B64G 1/24 244/158.8 |

(Continued)

FOREIGN PATENT DOCUMENTS

| EP | 2140285 B1 | 7/2011 |
| EP | 2335085 B1 | 12/2012 |

OTHER PUBLICATIONS

P.S. Maybeck, Stochastic Models, Estimation, and Control, Academic Press, vol. 1, p. 203-220 and 343, 1979 (Year: 1979).*

(Continued)

*Primary Examiner* — Bernarr E Gregory
*Assistant Examiner* — Fred H Mull
(74) *Attorney, Agent, or Firm* — Meagher Emanuel Laks Goldberg & Liao, LLP (57) ABSTRACT

The positioning receiver according to the invention comprises means for storing configuration information and information on its reception conditions, which is processed in order to calculate a current and/or predicted precision of the positioning calculation. Advantageously, at least some of this information is integrated into a variation model of a Kalman filter integrated into the receiver. The invention notably allows a more rapid convergence on a reference precision in a mono-frequency operating mode and transitions between a mono-frequency and bi-frequency mode to be smoothed. Advantageously, the precision information is delivered graphically or in numerical form to the user.

16 Claims, 8 Drawing Sheets

(56) References Cited

U.S. PATENT DOCUMENTS

| | | | |
|---|---|---|---|
| 2005/0228589 A1 | 10/2005 | Diggelen et al. | |
| 2006/0125686 A1* | 6/2006 | Deimert | G01S 19/54 342/357.59 |
| 2007/0126625 A1* | 6/2007 | Townsend | G01S 19/35 342/357.3 |
| 2008/0036643 A1* | 2/2008 | Kiukkonen | G01S 19/29 342/21 |
| 2008/0165053 A1 | 7/2008 | Liu et al. | |
| 2008/0248813 A1 | 10/2008 | Chatterjee | |
| 2010/0085252 A1 | 4/2010 | Laurichesse et al. | |
| 2011/0210888 A1 | 9/2011 | Mercier et al. | |
| 2014/0139371 A1* | 5/2014 | Veitsel | G01S 19/43 342/357.51 |
| 2014/0145878 A1* | 5/2014 | Barlett | G01S 19/09 342/357.46 |
| 2014/0184442 A1 | 7/2014 | Large et al. | |
| 2016/0363456 A1* | 12/2016 | Pujos | G01S 19/42 |

OTHER PUBLICATIONS

L. Hogle, Investigation of the Potential Application of GPS for Precision Approaches, Navigation: The Journal of the Institute of Navigation, vol. 35(3), p. 317-334, Fall 1988 (Year: 1988).*

M. Caissy et al., Coming Soon: The International GNSS Real-Time Service, GPS World, p. 52-58, Jun. 2012 (Year: 2012).*

L. Montloin et al., GNSS Multipath Failures Modes Analysis for Airport Surface Operations, ION GNSS 2013, 26th International Technical Meeting of the Satellite Division of the Institute of Navigation, p. 316-332, Sep. 2013 (Year: 2013).*

P.D. Groves, Principles of GNSS, Inertial, and Multisensor Integrated Navigation Systems, Second Edition, Artech House, p. 407-435, 2013 (Year: 2013).*

International Search Report for PCT/EP2015/066299, dated Dec. 14, 2015.

Written Opinion for PCT/EP2015/066299, dated Dec. 14, 2015.

Hauschild a., et al., "Combined GPS and GALILEO Real-time Clock Estimation with DRL's RETICLE System", GNSS 2012—Proceedings of the 25th International Technical Meeting of the Satellite Division of the Institute of Navigation (ION GNSS 2012), The Institute of Navigation, 8551 Rixlew Lane Suite 360, Manassas, VA 20109, USA, Sep. 17-21, 2012 (Sep. 21, 2012), pp. 302-309.

Montloin, L., et al, "GNSS multipath failures modes analysis for airport surface operations", GNSS—2013 Proceedings of the 26th International Technical Meeting of the Satellite Division of the Institute of Navigation (ION GNSS+ 2013), The Institute of Navigation, 8551 Rixlew Lane Suite 360, Manassas, VA 20109, USA, Sep. 20, 2013 (Sep. 20, 2013), pp. 316-332.

Hogle et al., "Investigation of the Potential Application of GPS for Percision Approaches", Navigation, Institute of Navigation, Fairfax, VA, USA, vol. 35, No. 3, Dec. 1, 1998 (Dec. 1, 1988), pp. 317-334.

Office Action for family member EP 15738363.9, dated Aug. 5, 2019.

* cited by examiner

| Parameter | Unit | Number | Initial covariance | Model noise (1s) |
|---|---|---|---|---|
| Receiver position | m | 3 | 50 m | 10 m |
| GPS (P1) receiver clock | m | 1 | 0 | |
| GPS P2 bias | m | 1 | 0 | 1 mm |
| GPS L1 bias | m | 1 | 0 | 1 mm |
| GPS 21 bias | m | 1 | 0 | 1 mm |
| GLO (P1) receiver clock | m | 1 | 0 | |
| GLO P2 bias | m | 1 | 0 | 1 mm |
| GLO L1 bias | m | 1 | 0 | 1 mm |
| GLO L2 bias | m | 1 | 0 | 1 mm |
| Vertical tropospheric delay | m | 1 | 0.5 m | 0.005 mm |
| Ionospheric delay | m | 1 per satellite (70) | 10 m | 2 mm |
| Nw phase ambiguities | Cycle | 1 per satellite (70) | 0 | 0 |
| N1 phase ambiguities | Cycle | 1 per satellite (70) | 0 | 0 |

FIG.4a

| Measurement | Unit | Typical noise |
|---|---|---|
| GPS code | m | 1 m |
| GLONASS code | m | 2 m |
| GPS phase | m | 1 cm |
| GLONASS code | m | 1 m |
| Vertical tropospheric delay | m | 0.1 cm (if dense network) |
| Ionospheric delay | m | 10 cm (for iono SBAS) |

| Configuration | Horizontal precision (RMS, cm) | Vertical precision (RMS, cm) | Convergence time (horizontal < 10cm) |
|---|---|---|---|
| bi_gps | 106.13 | 84.72 | n.a. |
| bi_gps_glo | 65.52 | 92.54 | n.a. |
| bi_gps_corr | 2.87 | 4.42 | 45 min |
| bi_gps_glo_corr | 2.64 | 3.66 | 20 min |
| bi_gps_glo_corr_iono | 2.65 | 3.68 | 20 min |
| bi_gps_glo_corr_amb | 2.04 | 3.16 | 20 min |

| Configuration | Horizontal precision (RMS, cm) | Vertical precision (RMS, cm) | Convergence time (horizontal < 1 m) |
|---|---|---|---|
| mono_gps | 59.47 | 78.75 | n.a. |
| mono_gps_glo | 69.88 | 83.19 | 2 h |
| mono_gps_glo_iono | 53.65 | 71.48 | 1 min |
| mono_gps_corr | 26.02 | 29.46 | 2 h |
| bi_gps_glo_corr | 23.31 | 33.62 | 30 min |
| bi_gps_glo_corr_iono | 24.80 | 27.99 | 1 min |

FIG.7d

POSITIONING AND NAVIGATION RECEIVER WITH A CONFIDENCE INDEX

FIELD OF THE INVENTION

The present invention relates to satellite navigation systems. More precisely, the aim of the invention is to produce information allowing the precision that may be guaranteed by a system depending on present and future operating conditions to be predicted, given the hardware and software configuration of the receiver of a user.

BACKGROUND

The first satellite constellation emitting positioning signals was put in place for military applications by the American state (global positioning system or GPS) from the start of the eighties. Since then, GPS signals have been used by professional civil applications (management of fleets of trucks, aerial navigation aids, geodetic surveys, etc.) and more recently in mass-market applications (automotive navigation with on-board terminals and pedestrian navigation with smartphone type terminals). Other constellations have been put in place by the Russian state (GLONASS) and Chinese state (Baïdou). A European satellite constellation (Galileo) is in the process of being deployed. Generally, these navigation systems are designated by the acronym GNSS (Global Navigation Satellite Systems).

The basic principle behind satellite navigation and positioning is the calculation, using a receiver equipped with electronic processing circuits, position, velocity and time (PVT) data from electromagnetic signals of centimetre-scale wavelength emitted by satellites in orbit. The calculation of the PVT data by a receiver from signals from satellites is affected by many errors of various types: the impact of the passage by the electromagnetic signals through the various layers of the atmosphere (troposphere, ionosphere), errors due to reflection of the signals from objects in the vicinity of the receiver (multipaths), clock errors, errors in the electronic processing circuits, etc. For military applications, these errors are notably corrected using specialized signals emitted on reserved carriers (P(Y) code for GPS). Specific multi-sensor processing and combining means are furthermore generally provided in order to guarantee the precision and integrity of measurements intended for critical uses. However these solutions are restricted and expensive. To meet the growing need for precision in civil applications, various means have been developed to correct the main errors: acquisition of signals originating from a plurality of constellations; improvement of antennae in order to increase reception robustness; use of correlation loops in receivers; differential GPS, which calls upon fixed base stations that broadcast a reference signal allowing errors to be corrected; terrestrial networks for broadcasting correction information; combination of satellite data with data from movement sensors integrated into the receiver, or providing information on the path of the receiver (map, terrain models); etc. In parallel, for specific applications having a high need for integrity, such as aerial navigation, procedures have been developed for determining a radius of protection allowing a zone of safety in which the navigation solution is guaranteed to be valid to be determined.

There are thus various techniques of obtaining a precise position (or PPP for Precision Position Point). These techniques are based on the acquisition of GPS signals and on the acquisition of signals from other constellations. Certain thereof use signals from bi-frequency (EP2140285) and even tri-frequency (EP2335085) receivers. A non-built-up environment on a very clear day is often considered to be an ideal case as regards implementation of these techniques. In the case of actual use, buildings, trees, and other elements of the environment will greatly degrade the reception and processing conditions of the positioning signals. Therefore, the measurements will be less good, to the point of causing the signal to be lost. Furthermore, the choice of a GNSS receiver is often made depending on a compromise between technical performance, cost and need. For example, in an urban environment, with many multipaths, commercial submetre positioning solutions combine the acquisition of GPS signals, the acquisition of EGNOS signals, inertial sensors, a map, a terrain model, etc. If the need is for a precision of about ten metres, at the present time simpler GPS techniques are sufficient and the navigation software will possibly position the receiver "at best".

For certain applications, it is not only necessary for the receiver to deliver a precise position/navigation measurement, but above all for it to give an indication of confidence in the measurement. Specifically, by way of nonlimiting example, for an autonomous vehicle driving on a road used by other traffic it is essential to be able to guarantee a measurement accurate to within one centimetre. It is also indispensable to be able to inform the driver of a foreseeable short-term degradation in the confidence of the position measurement so that he can retake control of the vehicle.

In aerial navigation, a radius of protection is defined around the aeroplane into which obstacles of the relief must not penetrate, but this radius of protection does not vary as a function of the conditions of reception of the navigation signals. Moreover, to take an example of a mass-market localization receiver, the "Maps" function of an iPhone™ indeed delivers an indication of the precision of the localization measurement under given reception conditions, this indication taking the form of a circle of a radius that varies depending on these conditions (large circle in the case of poor conditions; small circle in the case of good conditions). However, these indications are not proportional to the precision as regards distance, except when the localization is based on triangulation from Wi-Fi signals.

Thus, no prior-art system allows, at the present time, a measurement precision to be determined for the current and future position of a receiver of navigation signals depending on the hardware and software configuration of the receiver and its current position, so as to adapt, if needs be, the processing of the signals to obtain a given precision. It is particularly important to meet this need at a time when the Galileo constellation will soon become available, notably because the latter will permit for the first time civil receivers to acquire signals modulated at different frequencies. Specifically, the Applicant has observed experimentally that bi-frequency signals may deliver a lower precision, in certain environments, notably in the presence of multipaths, than the precision delivered by mono-frequency signals. It is therefore very useful to be able to adapt the way in which the positioning signals are processed depending on the operating conditions under which the receiver is being used.

SUMMARY OF THE INVENTION

The aim of the invention is to solve this problem, which is not solved in the prior art, by determining information regarding the current and future precision of the position determined by a receiver of positioning signals, said information depending on the hardware and software configuration of the receiver and on the reception conditions at the current position of the receiver.

For this purpose, the invention discloses a device of positioning signals from at least a satellite constellation, said receiver comprising: for a port to access information on absolute and/or relative values of a position measurement precision in a configuration of said receiver, said configuration being defined by elements chosen from a group comprising processors for processing positioning signals, antennae for receiving said signals, a list of constellations and a list of external links to data for correcting the positioning signals; and processing circuits to process raw positioning, velocity and time data for a satellite; processing circuits to calculate an information characterizing a precision and/or a confidence index of a calculation of a position of the receiver based on receiving conditions, the information on absolute and/or relative values of a position measurement precision in the configuration of said receiver and the result of the processing of the raw positioning, velocity and time data for the satellite.

Advantageously, the processing circuits to process raw positioning, velocity and time data comprise a Kalman filter, and the processing circuits of the invention being further configured to adjust one of a covariance matrix and a table of model noise parameters of the Kalman filter based on the information on absolute and/or a relative values of the precision and/or a confidence index of the position measurements in a configuration of said receiver.

Advantageously, the reception conditions are defined depending on positions and heights of obstacles in a vicinity of at least an element of said receiver.

Advantageously, a trajectory of at least one element of said receiver is predicted from a current position, velocity, time vector.

Advantageously, positioning signals from at least two satellite constellations are acquired by said receiver.

Advantageously, RTIGS corrections are acquired by said receiver.

Advantageously, the information characterizing the precision and/or the confidence index of the calculation of the position of the receiver is calculated further based on information on a hardware configuration of said receiver relating to an antenna and/or a processor for processing positioning signals of said receiver.

Advantageously, a switch between a mono-frequency receiving mode and a bi-frequency receiving mode is activated depending on the reception conditions at current and/or future location of said reception.

Advantageously, elements of configuration of said receiver are activated/deactivated depending on preset precision and/or confidence index objectives, depending on reception conditions at current and/or future location of said reception.

Advantageously, the receiver of the invention furthermore comprises an interface to communicate the information characterizing a precision and/or a confidence index of the position of the receiver to at least a user or an application.

Advantageously, the processing circuits to calculate a piece of information characterizing a precision and/or a confidence index of the calculation of a position of the receiver, for determining reception conditions, for accessing information on the absolute and/or relative values of a position measurement precision in the configuration of said receiver, and the processing circuits for processing raw position, velocity and time data for a satellite are not co-localized.

Advantageously, the information on absolute and/or relative values of a position measurement precision in a configuration of said receiver is not co-localized.

Advantageously, state variables of the Kalman filter represent ionospheric error corrections.

Advantageously, a model of a variation in the state variables of the Kalman filter representing ionospheric error corrections is defined to optimize convergence time of the calculation of position, velocity and time in the case of loss of at least one positioning signal.

Advantageously, the information characterizing a precision and/or a confidence index of the calculation of a position of the receiver is delivered to a user of said device either in graphical form, in numerical form, or in a combination of both.

The invention also discloses a method for receiving positioning signals from at least one satellite constellation, said method comprising: accessing information on absolute and/or relative values of a position measurement precision in a configuration of a receiver, said configuration being defined by elements chosen from a group comprising processors for processing positioning signals, antennae for receiving said signals, a list of constellations and a list of external links to data for correcting the positioning signals; processing raw positioning, velocity and time data for a satellite calculating an information characterizing a precision and/or a confidence index of a calculation of a position of the receiver on the basis of receiving conditions, information on the absolute and/or relative values of a precision of position measurements in the configuration of said receiver and the result of the processing of the raw positioning, velocity and time data for satellite.

The invention also discloses a system for delivering positioning information, comprising a plurality of the receiver according to the invention.

Another advantage of the invention is to allow, from information on the current and future precision of the position measurement, processing operations to be adapted to deliver position data having a precision set by the current and future needs of the user.

Another advantage of the invention is to give the user access to processing operations that provide him with the highest possible precision given the hardware and software configuration of his receiver and the current and future use conditions of said receiver.

Advantageously, the precision information is delivered to the user continuously, either in graphical form or in numerical form.

The solution of the invention also differs from the prior art by its robustness and the flexibility with which it can be adapted to mono-frequency, bi-frequency, tri-frequency, etc. GNSS signal reception systems. It is also possible, according to the invention, to combine multiple constellations (GPS, Galileo, Baïdou, Glonass, etc.), with correction broadcasting systems (SBAS—Satellite Based Augmentation System—or WAAS—Wide Area Augmentation System) such as EGNOS, Inmarsat, Argos, with AIS (Automatic Identification System) type systems or with cellular (3G, 4G) or local (Wi-Fi, WiMax) telecommunications systems.

Furthermore, in one preferred embodiment, the receiver of the invention comprises a Kalman filter that may be parameterized to integrate errors due to various effects, including the passage through the ionosphere, into its variation model, thereby allowing a better continuity of the localization to be guaranteed in the case of signal loss.

BRIEF DESCRIPTION OF THE DRAWINGS

The invention will be better understood and its various features and advantages will become apparent from the description of its various embodiments and from the following figures appended to the present application.

DETAILED DESCRIPTION OF THE INVENTION

Figure 1:
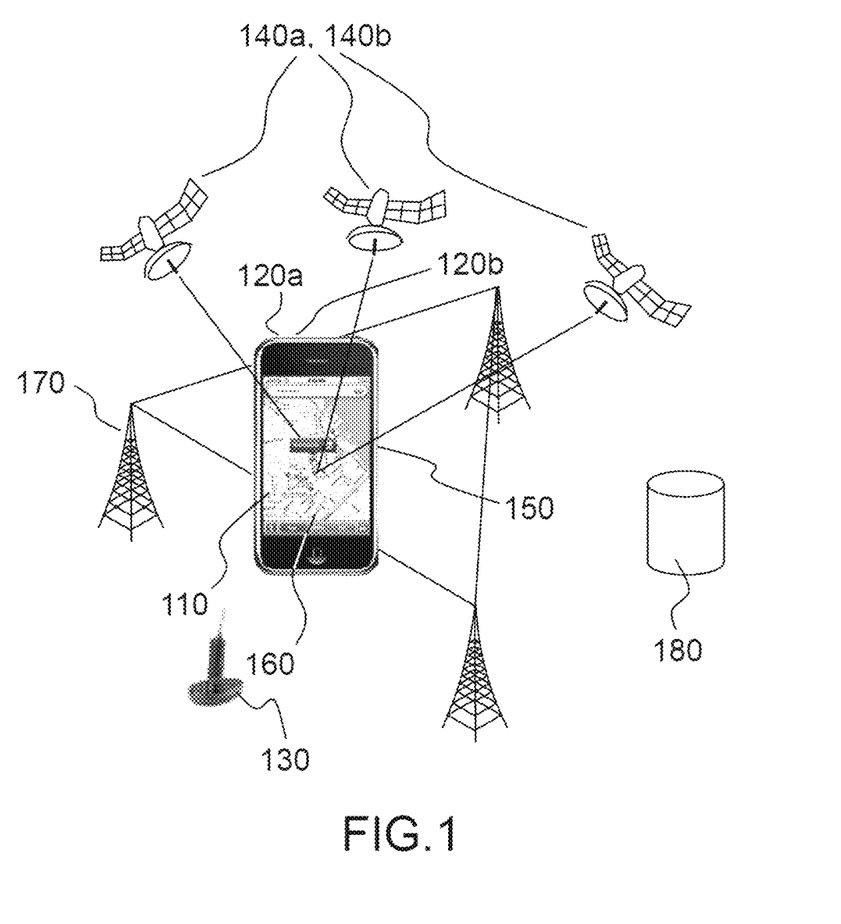
FIG. 1 illustrates an architecture of a system configured to implement the invention in a plurality of its embodiments.

FIG. 1 illustrates an architecture of a system configured to implement the invention in a plurality of its embodiments.

There are many different types of GNSS receivers, which may be relatively compact. By way of purely illustrative and nonlimiting example of the field of application of the invention, FIG. 1 shows a terminal consisting of a smartphone 110 provided with functionalities allowing signals to be acquired from at least one satellite navigation constellation 140. The terminal must be equipped with a specific antenna 120a, 120b to acquire the one or more signals from the satellites. It is possible to provide an exterior antenna 130 that improves the conditions of acquisition and tracking of the navigation signal. The interior antenna and the remote antenna may be mono-, bi- or tri-frequency antennae. The position of the remote antenna is chosen to optimize reception (notably for an automotive vehicle, a boat or an aeroplane) and may be mounted in a radome to limit the impact of multipaths. In a configuration of this type, the indication of confidence in the position measurement will be very high, as will be explained below. If the configuration of the antenna is minimal and/or if the environment of the terminal generates many multipaths, the indication of confidence will be lower than in the situation described above.

The smartphone is also provided with an antenna 120b for receiving 3G or 4G radiocommunication signals. In the case where the terminal is not a smartphone, it is possible to connect to the terminal a key enabling this reception via a USB port. Alternatively, the terminal may be connected to a wired network, either directly via an Ethernet port, or via a Wi-Fi or Bluetooth access.

The one or more antennae of the terminal allow signals to be acquired from one or more satellite navigation constellations 140a, 140b (GPS and often GLONASS). Depending on the position of the terminal relative to the satellites of these constellations and the local reception conditions, the quality of the acquisition and/or tracking of the signals of the minimum number of satellites required for the processing operations (three in general) will be higher or lower. Being able to acquire signals from a plurality of constellations therefore improves availability and the precision of and indication of confidence in the position measurements. Satellites that emit signals for correcting the signals of base constellations (referred to as SBAS signals), such as the EGNOS and Inmarsat satellites, also exist.

In the case of a smartphone, the satellite signals are processed either by an integrated circuit or an electronic board of the terminal, which board or circuit is specialized for this function, or by processing blocks of an integrated chipset 150, which also carries out other functions. Specialized electronic chips or boards are produced by the company U-Blox (for example under the reference Neo-7P™ for a PPP application), the company CSR (for example under the reference SiRFatlasVI™), and the company Broadcom (for example under reference BCM2075). The processing operations carried out with respect to each of the satellites by these specialized boards and chips to calculate the PVT are in general accessible to application developers, thereby permitting a certain flexibility in the implementation of the invention. The technology gpsOne™ from Qualcomm, integrated into the SnapDragon™ smartphone host chipset, is an example of a chipset localization block used in smartphones.

The positioning data issued from the processing operations carried out in the specialized units may be combined with map data 160.

The terminal 110 may also obtain correction information via a wireless or wired link by accessing via the Internet data provided by specialized networks 170, for example providing differential corrections and absolute correction data in real time (the Real Time International GNSS Service (RTIGS) for example) in the standardized RTCM SC-104 (Radio Technical Commission for Maritime Services Special Committee 104) format.

According to the invention, the terminal may access, either locally or remotely, data allowing one of its processors to calculate the current precision of, optionally corrected, positioning measurements and the variation over time in said precision depending on the predicted path of the terminal, variations in reception conditions and any modifications to its hardware configuration parameters (i.e. switch between bi-frequency and mono-frequency processing on account of multipaths).

Figure 2:
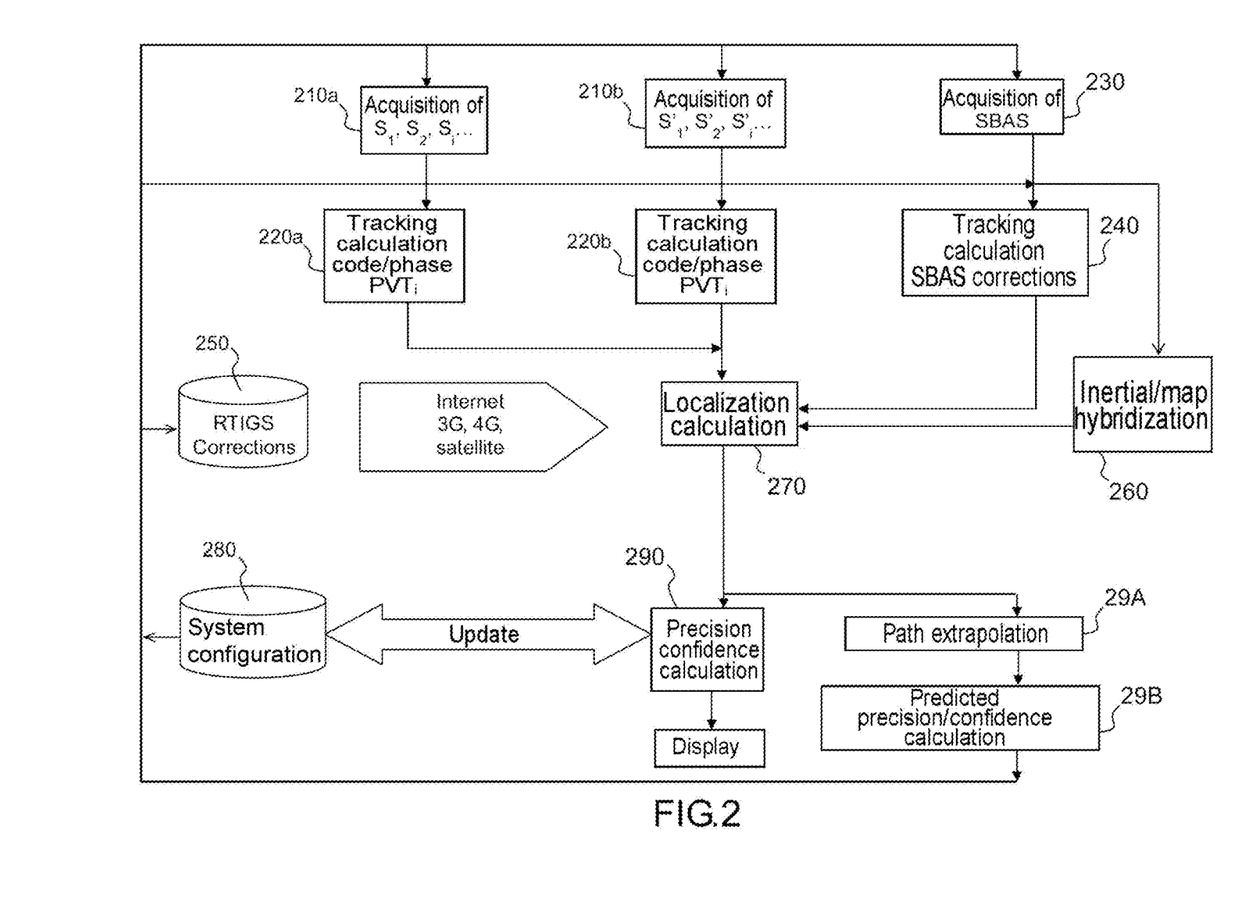
FIG. 2 shows a general flowchart of processing operations of a process for calculating a position according to the invention in a plurality of its embodiments.

FIG. 2 shows a general flow chart of the processing operations of a process for calculating a position according to the invention in a plurality of its embodiments.

It will be noted that most of the steps described below are optional, since their execution depends on the configuration of the navigation signal receiver in which the invention is implemented, and as said receiver may range from a simple block appended to a radiocommunication chipset in a smartphone to a sophisticated receiver provided with many additional software and hardware elements allowing the conditions of reception and processing of the navigation signals to be improved.

On initialization, the receiver is in a default reference configuration and starts by acquiring the signals of the satellites of the constellations corresponding to this configuration (steps 210a, 210b). Furthermore, the receiver may if needs be acquire SBAS correction signals (step 230). Once a sufficient number of satellite has been captured, operations 220a, 220b for processing correlation codes conveyed by the mono- or multi-frequency signals and/or the phase of the one or more carriers allows axial PVT vectors and SBAS corrections (step 240) to be calculated. RTIGS corrections may furthermore be acquired over terrestrial or satellite radiocommunication networks (step 250). The radionavigation measurements may be hybridized with data issued from inertial sensors, sensors for determining heading, or from maps (step 260). The main processor of the terminal may then perform a localization calculation (step 270), while taking into account, if needs be, in a Kalman filter, a model of the variation in errors due to various effects, such as the passage through the ionosphere and troposphere, the clocks and the orbits and ephemerides of the satellites of the constellation, etc.

The current confidence in and precision of the measurement are then calculated (step 290), in a way that will be detailed below in the description with regard to FIG. 3 and FIG. 4. These calculations take into account the configuration of the receiver, the parameters of which are stored in a system configuration database 280, and the sequence of operations carried out in the preceding steps, parameters of which, characterizing the environment of the receiver, may be stored, at least temporarily, in the database 280. The path of the receiver over a given time interval may be calculated from the calculated PVT vector (step 29A) and a variation in the precision and confidence of the measurements may also be predicted. The receiver may be programmed to automatically trigger an update of its configuration on the basis of confidence and precision objectives set notably by the application, said objectives being related to the configuration parameters by heuristics fed with the operational configuration stored in the system configuration database 280. These updating operations are illustrated by the backward pointing arrows connecting the precision/confidence calculation 290, the system configuration database 280 and the steps of acquisition 210*a*, 210*b*, processing 220*a*, 220*b*, correction SBAS 230, 240, RTIGS correction 250 and hybridization 260. Said heuristics may if needs be take into account objectives for the stealth or power consumption of the terminal or the robustness of the measurement.

Figure 3:
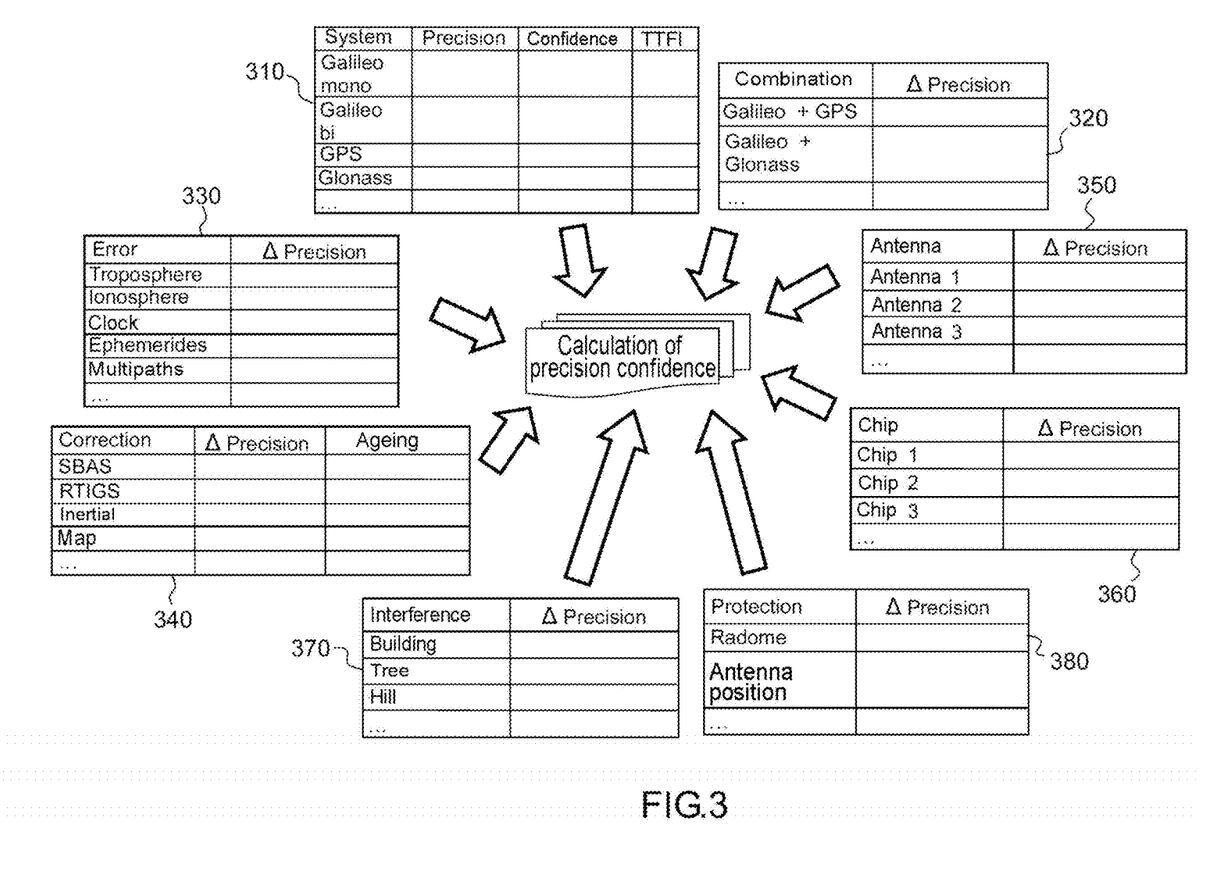
FIG. 3 shows a flowchart of processing operations for determining the precision of the measurements according to the invention in a plurality of its embodiments.

FIG. 3 shows a flow chart of the processing operations used to determine the precision of the measurements according to the invention in a plurality of its embodiments.

According to the invention, a database is provided for storing permanent and variable elements characterizing all or some of the following elements:

Precisions, confidence indexes and convergence indexes for the satellite constellations the signals of which the receiver is able to acquire and process at the reception location, taking into account the availability of a single carrier frequency or of a plurality of carrier frequencies (table 310);

Variations in precision, which are obtained by combining signals originating from at least two constellations (table 320);

Errors, measured by their impact on measurement precision, that affect signals originating from a given constellation in a given location; these errors are notably those resulting from the passage through layers of the troposphere and ionosphere, clock errors, ephemerides errors, etc. (table 330);

The improvement in and ageing (i.e. the decrease over time) of precision obtained by integrating correction data, such as SBAS and RTIGS data, inertial aids and map aids (table 340);

The improvement in precision resulting from selection of a given antenna (table 350);

The improvement in precision resulting from selection of a given specialized chip designed to process navigation signals (table 360);

The effect of multipath interference on the precision, resulting from different types of interfering object (trees, buildings, etc.) (table 370); and The attenuation of interference resulting from choices relating to receiver configuration, such as the use of a radome on the one or more antennae or the position of the antennae.

Other tables relating to other elements that may affect the precision of or the indication of confidence in the measurements may be added in the context of the present invention.

The description of the fields of the various tables indicated is in no way limiting. Other fields may be added, if the physical reality or logic of the data that they represent have an impact on the precision of the measurements or their confidence index.

All the tables of the database may be located in the receiver. However certain thereof may be located on a remote server maintained by a service provider.

The various tables, which may be organized according to a relational or object-oriented model, may be combined to calculate the overall precision resulting from the various errors and various corrections. The database model of the database allowing this calculation to be carried out will adhere to rules accessible to those skilled in the art of navigation systems.

The various tables of the relational or object-oriented database are combined to define the overall precision and/or a confidence index of the measurements, this combination being achieved using management rules that those skilled in the art will be able to define.

Figure 4A:
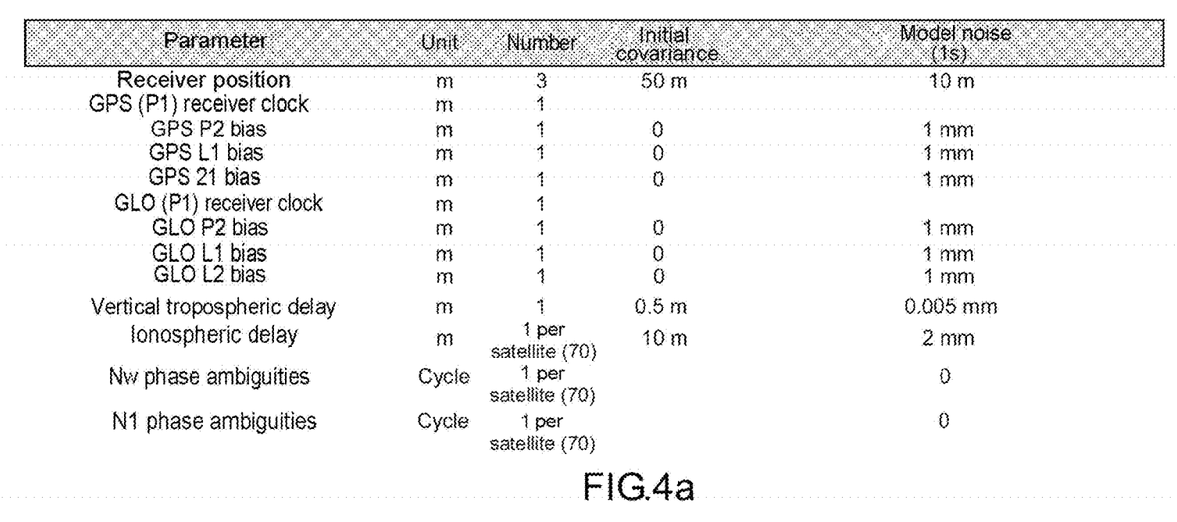
FIGS. 4a and 4b show examples of parameterization of a Kalman filter of a receiver in a plurality of embodiments of the invention.
Figure 4B:
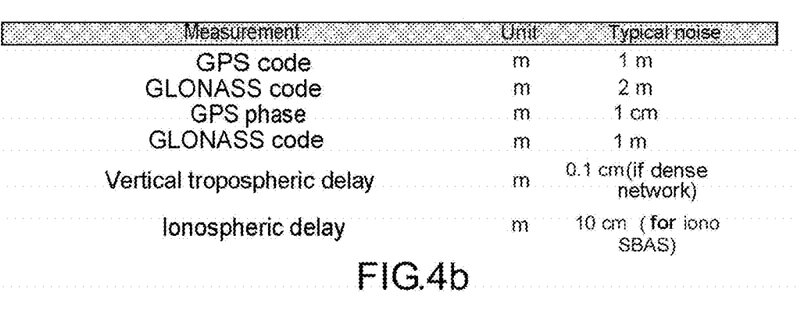

Alternatively or complementarily, certain parameters of the tables described above may be delivered to one or more Kalman filters, as illustrated in FIGS. 4*a* and 4*b* and the accompanying commentary below.

FIGS. 4*a* and 4*b* show examples of parameterization of a Kalman filter of a receiver in a plurality of embodiments of the invention.

It is conventional to integrate a Kalman filter into a loop for processing signals of a GNSS receiver. The filter may be of simple type, of extended type (Extended Kalman Filter or EKF) or of "Unscented" type (Unscented Kalman Filter or UKF). The configuration may comprise a single filter that processes all the satellite data of the one or more constellations or one filter may be provided per a constellation. Data for increasing the precision of the measurements, such as SBAS, ABAS, WAAS or AIS signals, and data originating from inertial sensors may be integrated into the one or more filters.

A Kalman filter is characterized by a state vector, a variation model and a measurement model. The state vector comprises the variables that will be calculated iteratively in the filter. The variation model is defined depending on physical laws that determine the variation of the various state variables. The measurement model takes into account the noise affecting the precision of the measurements. A covariance matrix is defined to calculate the limits of the variation of the variables depending on the variation model and the measurement model. A gain factor is set or calculated to define the temporal variation of the variables.

According to the invention, in a plurality of its preferred embodiments, variations in corrections to be applied to the main errors, due notably to the passage through the ionosphere, are modelled in the one or more Kalman filters.

FIG. 4*a* indicates examples of parameterization of various errors in the covariance matrix and the model noise of a Kalman filter in a plurality of embodiments of the invention. In the configuration illustrated, the receiver is able to receive and process signals from two constellations (GPS and GLONASS). Signals from other constellations may be added without difficulty by those skilled in the art. In the parameterization illustrated in the figure, clock errors and the biases of the two constellations are modelled. The same goes for tropospheric and ionospheric delays, and phase ambiguities. Other errors may be added without departing from the scope of the invention. The modelling includes, for each error, a factor of the covariance matrix of the filter and a model noise, which are determined by empirical rules and/or simulations and trials. In the example, all the errors are parameterized into a single filter. It is however possible to provide a plurality of filters.

FIG. 4b indicates examples of parameterization of measurement noise included in the Kalman filter in various measured errors and parameters, notably the tropospheric and ionospheric delays, when these parameters are acquired from an SBAS system.

FIGS. 5a to 5d illustrate the impact of taking into account errors due to the passage through the ionosphere on the continuity of the measurements, in a plurality of embodiments of the invention.

FIGS. 5a to 5d illustrate the case of a navigation receiver capable of receiving signals at two frequencies L1 and L2, such as will be the case for receivers able to receive signals from the Galileo constellation.

Figure 5A:
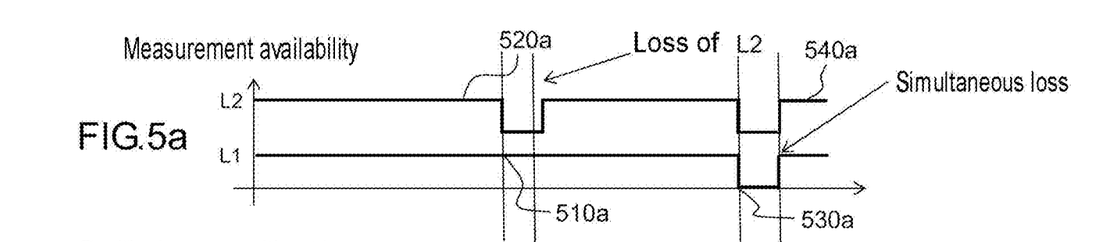
FIGS. 5a to 5d illustrate the impact of taking into account errors due to the passage through the ionosphere on measurement continuity, in a plurality of embodiments of the invention.

FIG. 5a illustrates, in a prior-art receiver, the loss at two successive instants, 510a, first of the signal L1 and, at a subsequent instant, 530a, of the two signals L1, 520a, and L2, 540a.

Figure 5B:
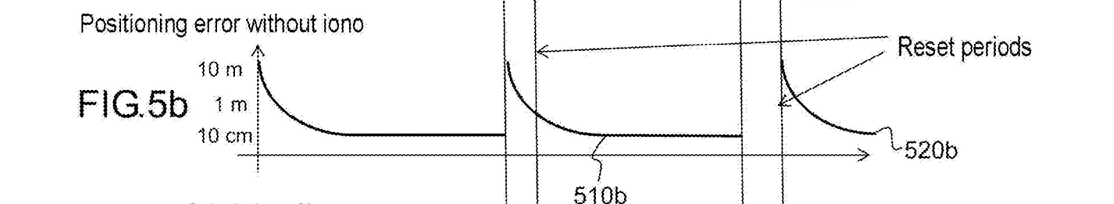

In so far as, conventionally, corrections of errors due to the passage through the ionosphere are carried out by correlation of the signals L1 and L2, the loss of one of the frequencies leads to an instantaneous increase in these errors. The operation of the receiver in a prior-art embodiment is illustrated in FIG. 5b, in which the precision of the localization measurement converges only at the instants 510b, 520b on the reference precision, of about 10 cm. It will be noted that SBAS corrections are not able to correct this reset bias in so far as the correction precision delivered by these measurements is only about one metre. RTIGS corrections enable sufficient compensation of the bias only under exceptional conditions in which the density of measurements is very high, and such conditions cannot be taken for granted in the majority of cases.

Figures 5C, 5D:
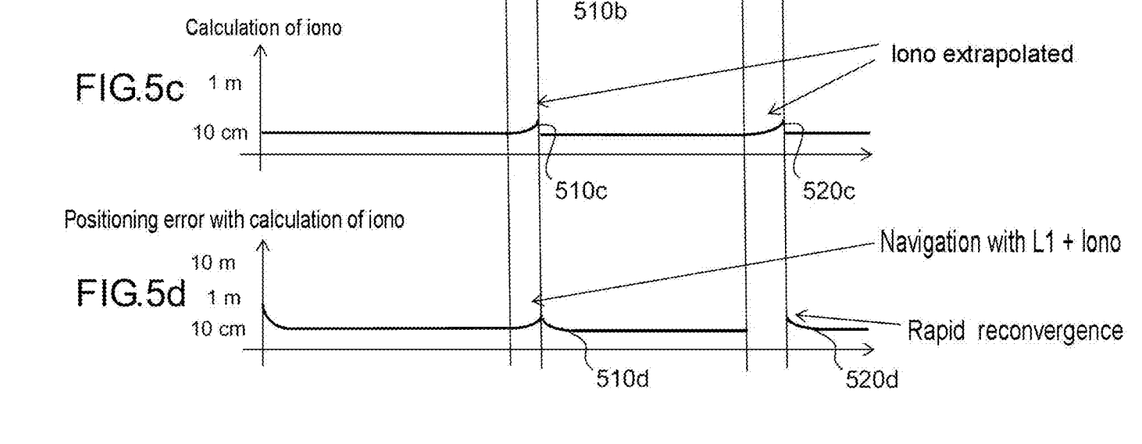

FIGS. 5c and 5d illustrate the impact of integrating, according to a plurality of preferred embodiments of the invention, a model of variation in ionospheric corrections into the Kalman filter.

In FIG. 5c the impact 510c, 520c of the propagation in the Kalman filter of the model of correction of ionospheric errors on the precision of the measurement may be seen.

In FIG. 5d, it may be seen that the instants 510d, 520d at which the measurement precisions converge on the reference value are anterior to the instants 510b, 520b. In the case where only the frequency L1 is available, the convergence is ensured by the combination of the positioning calculation for this frequency and the propagation of the ionospheric error. In the case where both frequencies L1 and L2 are lost, the positioning calculation is carried out from the position determined before the losses using the propagation of the ionospheric error.

Figure 6:
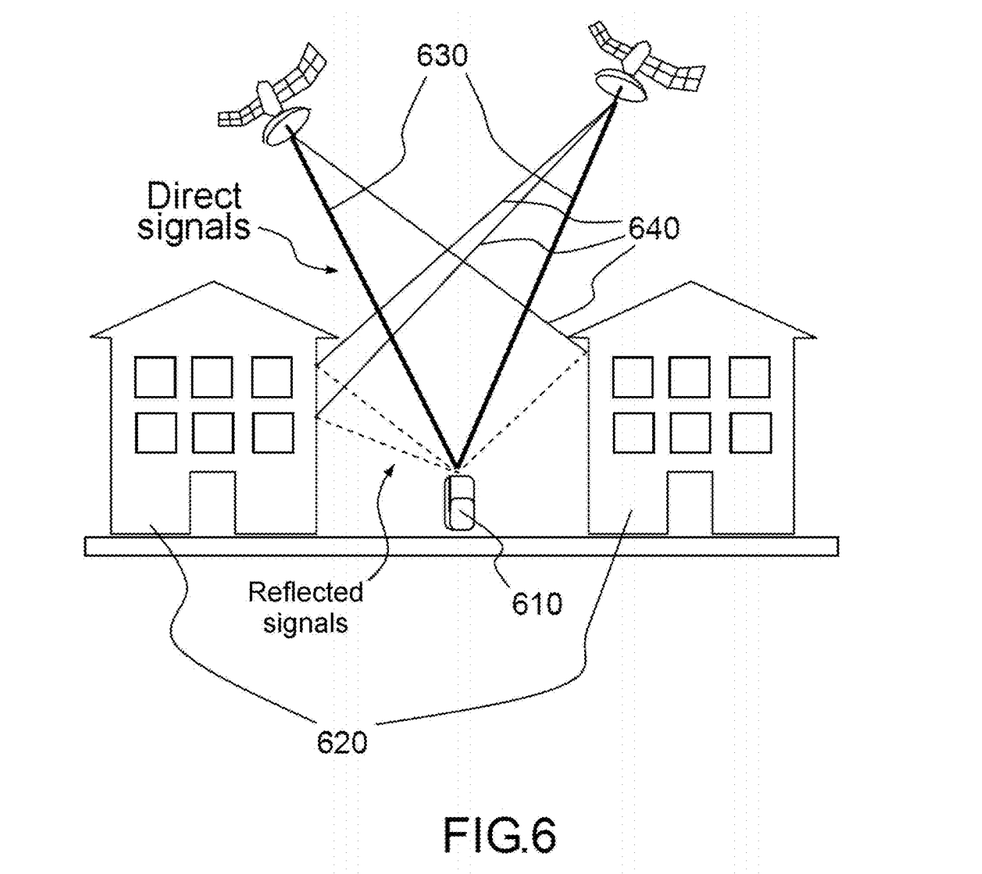
FIG. 6 illustrates the underlying problem of multipaths in urban environments.

FIG. 6 illustrates the underlying problem of multipaths in urban environments.

A receiver 610 is positioned between two buildings 620. Certain signals 630 reach the receiver in a direct line. Other signals 640 reach the receiver after having been reflected from the buildings. A standard receiver is not able to make a difference between direct signals 630 and reflected signals 640, thereby leading to a positioning error. To correct multipath errors, the various types of obstacle of a given reception location, with their height characteristics, and multipath propagation/correction models may be stored in the database described with reference to FIG. 3.

The Applicant has observed experimentally that the adverse effect of multipaths is greater for receivers operating in a bi-frequency mode than for receivers operating in a mono-frequency mode. Thus, surprisingly, a receiver operating in a mono-frequency mode, aided by suitable corrections (notably RTIGS corrections, antenna selection or antenna protection corrections, or local multipath corrections), will be able to provide a precision and confidence indication of higher quality than a receiver operating in a bi-frequency or tri-frequency mode. The use of the invention therefore allows potentially better precision and confidence indication conditions to be guaranteed with a receiver operating under conditions adapted to the reception conditions.

FIGS. 7a to 7d illustrate the precisions and convergence times of the measurements in a bi-frequency configuration and in a mono-frequency configuration in a plurality of embodiments of the invention.

The various operating configurations are defined in the following way in the figures (either for bi-frequency operation (case of FIGS. 7a and 7b) or for mono-frequency operation (case of FIGS. 7c and 7d)):
  GPS signals without RTIGS or ionospheric correction;
  GPS signals and GLONASS signals without RTIGS or ionospheric correction;
  GPS signals with RTIGS correction;
  GPS signals and GLONASS signals with RTIGS correction;
  GPS signals and GLONASS signals with RTIGS correction and ionospheric correction; and
  GPS signals and GLONASS signals with RTIGS correction and correction of integer ambiguities.

Figure 7A:
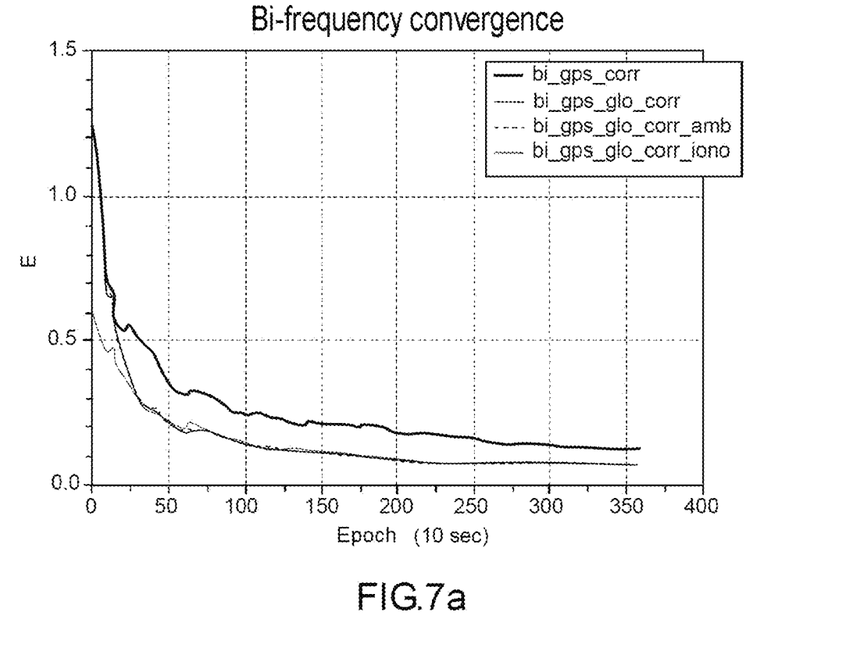
FIGS. 7a to 7d illustrate the precisions and convergence times of measurements in a bi-frequency configuration and in a mono-frequency configuration in a plurality of embodiments of the invention.
Figure 7B:
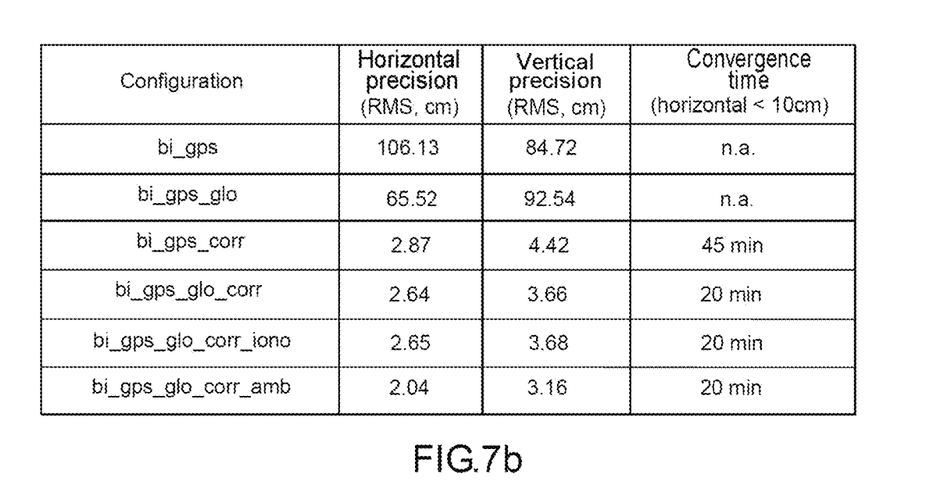

FIGS. 7a and 7b illustrate graphically and with numerical results the operating conditions of a receiver of navigation signals in bi-frequency mode. It may be seen that the precision is centimetre scale under all the operating conditions with corrections but that the convergence time is never shorter than 20 mn.

Figure 7C:
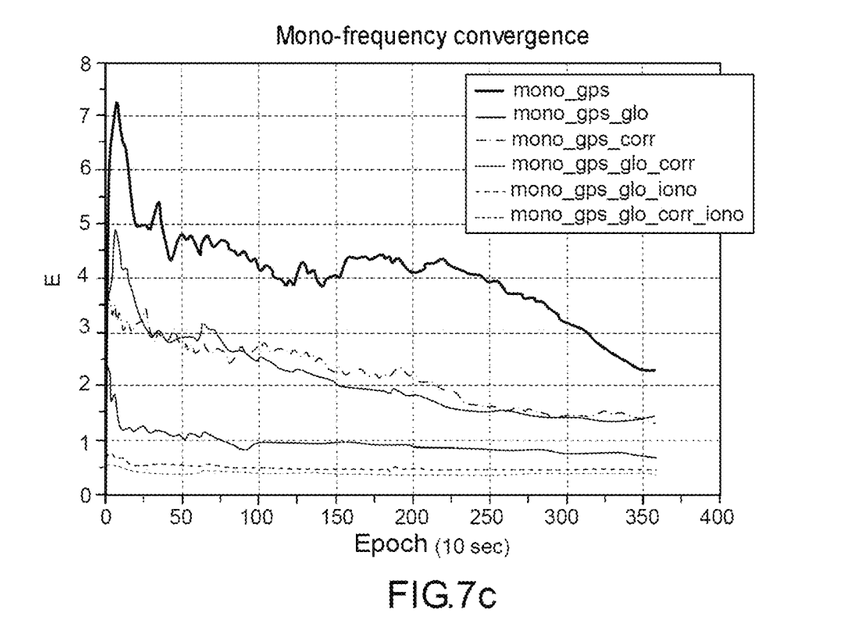
Figure 7D:
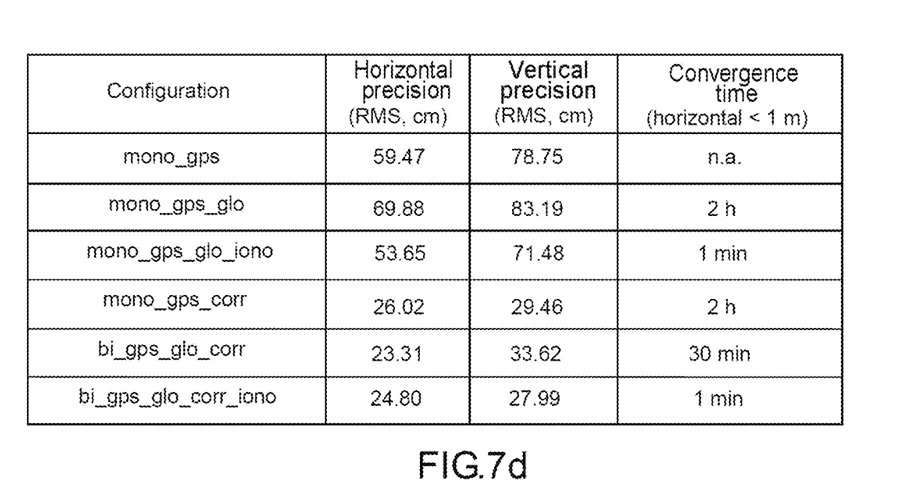

FIGS. 7c and 7d illustrate graphically and with numerical results the operating conditions of a receiver of navigation signals in mono-frequency mode. It may be seen that the precision passes from the centimetre scale to a decimetre scale. However, the horizontal convergence time is about one mn instead of 20 mn in the case where the ionospheric corrections are propagated.

The examples described above are only illustrative of certain embodiments of the invention. They in no way limit the scope of the invention which is defined by the following claims.

The invention claimed is:

1. A receiver of positioning signals from at least a satellite constellation, said receiver comprising:
  a port configured to access information on absolute and/or relative values of a position measurement precision in a configuration of said receiver, said configuration being defined by elements chosen from a group comprising processors for processing positioning signals, antennae for receiving said signals, a list of constellations and a list of external links to data for correcting the positioning signals; and
  processing circuits configured to process raw positioning, velocity and time data for a satellite;
  the processing circuits configured to calculate an information characterizing a precision and/or a confidence index of a calculation of a position of said receiver based on receiving conditions, the information on absolute and/or relative values of a position measurement precision in the configuration of said receiver and the result of the processing of the raw positioning, velocity and time data for the satellite;

wherein the information characterizing the precision and/or the confidence index of the calculation of the position of said receiver is calculated further based on information on a hardware configuration of said receiver relating to an antenna and/or a processor for processing positioning signals of said receiver, said information being provided by a database characterizing permanent and variable elements of said hardware configuration.

2. The receiver of claim 1, wherein the processing circuits to process raw positioning, velocity and time data comprise a Kalman filter, said processing circuits being further configured to adjust one of a covariance matrix and a table of model noise parameters of the Kalman filter based on the information on absolute and/or relative values of the precision and/or a confidence index of the position measurements in a configuration of said receiver.

3. The receiver of claim 2, wherein state variables of the Kalman filter represent ionospheric error corrections.

4. The receiver of claim 3, wherein a model of a variation in the state variables of the Kalman filter representing ionospheric error corrections is defined to optimize convergence time of the calculation of position, velocity and time in the case of loss of at least one positioning signal.

5. The receiver of claim 4, wherein the information characterizing a precision and/or a confidence index of the calculation of a position of the receiver is delivered to a user of said device either in graphical form, in numerical form, or in a combination of both.

6. The receiver of claim 1, wherein the reception conditions are defined depending on positions and heights of obstacles in a vicinity of at least an element of said receiver.

7. The receiver of claim 1, wherein a trajectory of at least one element of said receiver is predicted from a current position, velocity, time vector.

8. The receiver of claim 1, wherein positioning signals from at least two satellite constellations are acquired by said receiver.

9. The receiver of claim 1, wherein Real Time International GNSS Service (RTIGS) corrections are acquired by said receiver.

10. The receiver of claim 1, wherein a switch between a mono-frequency receiving mode and a bi-frequency receiving mode is activated depending on the reception conditions at current and/or future location of said reception.

11. The receiver of claim 1, wherein elements of configuration of said receiver are activated/deactivated depending on preset precision and/or confidence index objectives, depending on reception conditions at current and/or future location of said reception.

12. The receiver of claim 1, further comprising an interface to communicate the information characterizing a precision and/or a confidence index of the position of the receiver to at least a user or an application.

13. The receiver of claim 1, wherein the processing circuits to calculate a piece of information characterizing a precision and/or a confidence index of the calculation of a position of the receiver, for determining reception conditions, for accessing information on the absolute and/or relative values of a position measurement precision in the configuration of said receiver, and the processing circuits for processing raw position, velocity and time data for a satellite are not co-localized.

14. The receiver of claim 1, wherein the processing circuits to calculate information on absolute and/or relative values of a position measurement precision in a configuration of said receiver are not co-localized.

15. A method for receiving positioning signals from at least one satellite constellation, said method comprising:
accessing information on absolute and/or relative values of a position measurement precision in a configuration of a receiver, said configuration being defined by elements chosen from a group comprising processors for processing positioning signals, antennae for receiving said signals, a list of constellations and a list of external links to data for correcting the positioning signals;
processing raw positioning, velocity and time data for a satellite;
calculating an information characterizing a precision and/or a confidence index of a calculation of a position of said receiver from receiving conditions, information on the absolute and/or relative values of a precision of position measurements in the configuration of said receiver and a result of the processing of the raw positioning, velocity and time data for satellite;
wherein the information characterizing the precision and/or the confidence index of the calculation of the position of said receiver is calculated further based on information on a hardware configuration of said receiver relating to an antenna and/or a processor for processing positioning signals of said receiver, said information being provided by a database characterizing permanent and variable elements of said hardware configuration.

16. A system for delivering positioning information, comprising a plurality of receivers of positioning signals from at least a satellite constellation, each said receiver comprising:
a port configured to access information on absolute and/or relative values of a position measurement precision in a configuration of said receiver, said configuration being defined by elements chosen from a group comprising processors for processing positioning signals, antennae for receiving said signals, a list of constellations and a list of external links to data for correcting the positioning signals; and
processing circuits configured to process raw positioning, velocity and time data for a satellite;
the processing circuits configured to calculate an information characterizing a precision and/or a confidence index of a calculation of a position of said receiver based on receiving conditions, the information on absolute and/or relative values of a position measurement precision in the configuration of said receiver and the result of the processing of the raw positioning, velocity and time data for the satellite;
wherein the information characterizing the precision and/or the confidence index of the calculation of the position of said receiver is calculated further based on information on a hardware configuration of said receiver relating to an antenna and/or a processor for processing positioning signals of said receiver, said information being provided by a database characterizing permanent and variable elements of said hardware configuration.

* * * * *